Dec. 15, 1964  R. D. BUSCH  3,160,920
APPARATUS FOR FORMING PLASTIC CONTAINERS
Original Filed May 20, 1959
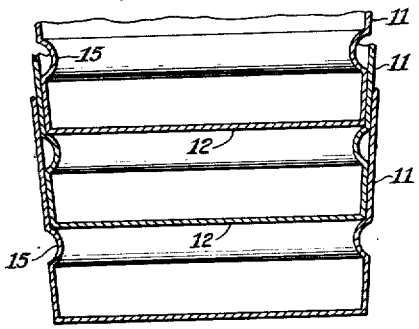
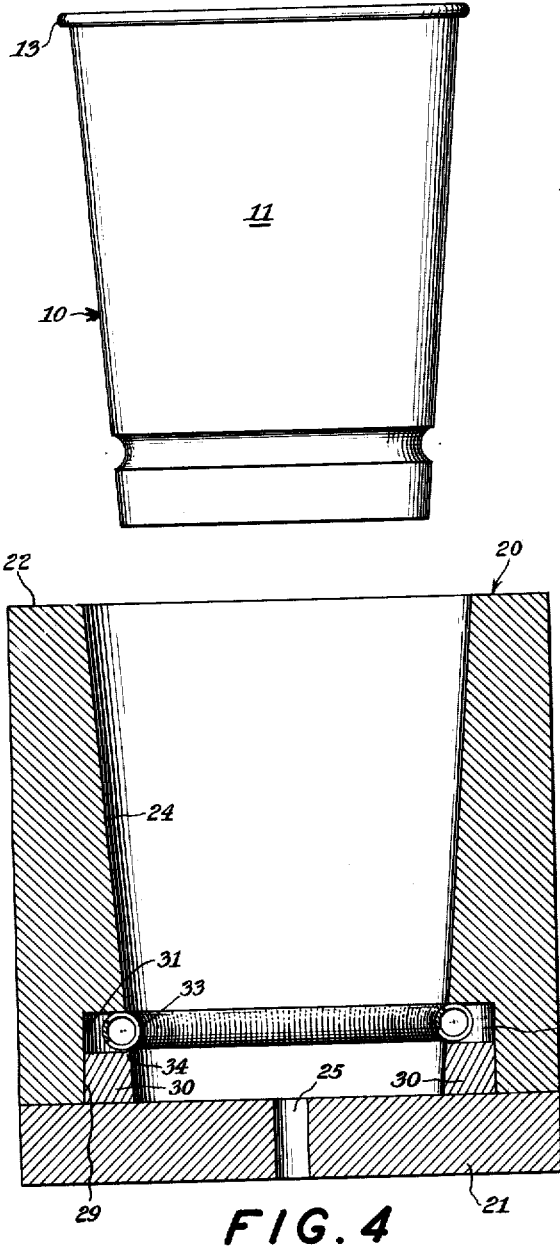
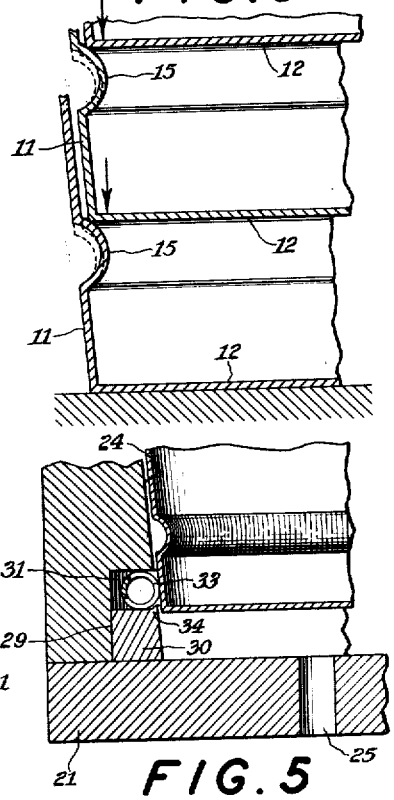
INVENTOR.
RICHARD D. BUSCH
BY Harold L. Jenkins
ATTORNEY United States Patent Office 3,160,920
Patented Dec. 15, 1964

3,160,920
APPARATUS FOR FORMING PLASTIC
CONTAINERS
Richard D. Busch, Springfield, Pa., assignor to Scott
Paper Company, Philadelphia, Pa., a corporation of
Pennsylvania
Original application May 20, 1959, Ser. No. 814,419.
Divided and this application Nov. 17, 1961, Ser. No.
154,924
3 Claims. (Cl. 18—35)

The present invention relates to apparatus for forming from planar elements of organic thermoplastic resins molded plastic containers provided with integrally formed annular spacing elements to enable satisfactory stacking or nesting thereof as well as the dispensing or separation of individual containers from such stacks, as divided from my copending application Serial No. 814,419, filed May 20, 1959, now abandoned.

The conventional nestable container, whether of plastic or paper, is generally of frustro-conical configuration tapering from the larger open end to a smaller, lower end which is closed either by integrally formed base or a circular plate adhesively positioned inside the container and slightly above the end thereof. The integrally formed base is generally to be preferred inasmuch as separate bases frequently are improperly positioned and incompletely sealed to the side wall with the result that the containers which embody such bases leak or even collapse upon filling.

An essential feature of the customary nestable container is a spacing element required to protect the containers against damage when they are subjected to forces incident to static loads in storage or from impact while being handled. Such elements also enable the serial release of containers from stacks of containers disposed in automatic dispensing mechanism by assuring uniform spacing between the individual elements in the stack and a nesting arrangement which permits each element to separate freely and positively from the stack.

In adapting paper containers or cups for machine dispensing, an insert type bottom provided with a flared collar permits adequate spacing of stacked articles to assist in a proper release thereof. A similar arrangement has not, however, been possible with molded plastic containers wherein the bottom is integral with the side walls and, as a substitute therefor, attempts have been made to form a molded recess or re-entrant area adjacent the bottom of the container to function as a bearing surface upon which the bottom edge of the container nested inside will be supported. Manifestly, however, these recesses or re-entrant areas are restricted both in size and effectiveness by limitations in mold design and operability. In actual practice, the previously designed re-entrant areas have not been satisfactory to protect heavy stacks of plastic containers against seizure and blocking during handling and storage. Failure, up to the point of material fracture, is found to occur as the interiorly supported containers are forcibly driven beyond the bearing surfaces of the immediately adjacent surrounding containers which results in the frictional binding of several or all of the stacked containers into a blocked assembly.

It is an object of the present invention to provide a novel form of annular recess to serve as a spacing element for a nestable plastic container.

A further object of my invention is to provide a plastic container which is readily dispensed serially in automatic machinery.

Other objects and advantages of my invention will be readily apparent from the following detailed description of a preferred embodiment thereof when taken in conjunction with the accompanying drawing wherein:

FIGURE 1 is a side elevational view of a container embodying my inventive concept;

FIGURE 2 is a fragmentary vertical section of a series of nested containers of the type shown in FIGURE 1;

FIGURE 3 is a fragmentary vertical section, on an enlarged scale, illustrating deflection cushioning effects in a series of nested plastic containers subjected to compressive forces;

FIGURE 4 is a vertical section of a vacuum forming mold adapted to the production of the container of FIGURE 1; and FIGURE 5 is a fragmentary vertical section, on an enlarged scale, of the mold apparatus of FIGURE 4, illustrating the manner of release of a molded container therefrom.

Referring more particularly to FIGURES 1, 2 and 3 of the drawings, a container 10, which may be molded of any suitable thermoplastic organic resin such as polyethylene, polyvinyl acetate, polystyrene, polymethyl methacrylate or the like, has a side wall 11 tapering downwardly and inwardly, generally in frustro-conical shape from an open upper end to a narrower lower end closed by a bottom 12 formed integrally therewith. The upper end of the container is finished in any desired manner, as for example, with a rolled lip 13. The side wall 11 of the container carries an annular, inwardly directed arcuate and preferably semicircular groove 15 adjacent to but spaced slightly above the bottom 12 of the container.

As shown in FIGURE 2, when a plurality of the containers 10 are nested, the bottoms 12 of the interiorly located containers are supported upon the upper areas of the annular grooves 15 of the immediately adjacent accommodating container. The location of and nature of the support element provides an elastic buffer against shocks acting along the axis of a stack of containers. Any impacts directed downwardly through the containers will be absorbed by temporary elastic deformation or compression of the grooves 15, to the position indicated by the dotted lines shown in FIGURE 3.

Inasmuch as the manner of molding of the containers 10 is essential to their successful adaptation, I have shown in FIGURES 4 and 5 an apparatus designed for the drawing or molding of sheeted thermoplastic organic resins into containers. A differential pressure forming mold 20, of cast or machined metal, consists of a base element 21 and a body portion 22 in which is provided a forming cavity 24 shaped to the configuration corresponding to the outer surface of the container to be formed therein. Within the base 21, a port 25 is provided which is connected through suitable means to a vacuum pump (not shown) and, alternately at will, to an air pump (not shown) by means of which the fluid pressure within the mold cavity 24 may be varied as desired.

In the manner well known to those skilled in the art suitable clamping elements and radiant heaters for mounting and aiding the plastic flow of resin sheeting into the mold cavity 24 will be arranged above the mold 20 and in close proximity thereto. The utilization of plug forming dies to advance the plastic sheeting into the mold, supplementing the forming action of fluid pressures and ejector mechanisms are also regarded as auxiliary components of molding techniques.

As best seen in FIGURE 4, the body 22 of the mold 20 is provided with a rabbet 29 along its interior edge adjacent the base element 21. An anvil 30 is secured by any suitable means within this rabbet and is of such dimensions and so located that an annular channel 31 is formed adjacent to but spaced from the base element 21. Seated within the channel 31 is a continuous spiral coil, i.e. toroidal, spring 33 which by appropriate length adjustment in relaxed position has an overall diameter less than that of the channel 31 in which it is positioned, such diameter relation insuring that the spring will not lie entirely within the channel but will project into the mold cavity. A detent or retaining lip 34 on the inner edge of the anvil 30 prevents dislodgement of the spring 33 from the channel 31 and at the same time assures proper placement of the spring in said channel.

Container molding is carried out in the described mold by positioning a thermoplastic resin sheet above the mold and heating it to plasticity. As soon as the sheet softens and sags into contact with the walls of the mold, a vacuum or partial vacuum is created in the mold cavity causing the sheet to be drawn into the mold and to assume the conformation thereof. During the forming operation the plastic sheet material is further molded by contact with the spring coil 33 and the semicircular recess 15 is produced. The molded container so obtained is allowed or caused to cool and is then removed from the mold by suitable means, as for example, by introduction of air pressure through the port 25 with the assistance of a mechanically applied ejection force operating upon the residual unformed plastic material at the top edge of the mold. This product removal is accomplished without material damage since the coil spring 33 is easily expanded, as shown in FIGURE 5, to move out of the molded groove 15, and into the channel 31, upon application of pressure from the hardened side wall 11 of the container as it is carried upwardly from the mold. The spring 33 subsequently returns to its original position within this mold cavity for a succeeding container formation.

It will be obvious that the described process, apparatus and product are susceptible of considerable modification without departing from the spirit of the invention or the scope of the appended claims.

What I claim is:

1. In a mold for forming a container from thermoplastic sheet material, a rigid mold body having a forming cavity therein, said mold body having an annular channel therein opening to side wall portions of said cavity, and an annular modifying member formed of resilient material and positioned in said channel, said channel being of sufficient size to permit radial expansion of said modifying member, said modifying member projecting from said channel into said cavity and resisting deformation during formation of a container to produce an annular groove in the side wall of said container, said modifying member being capable of undergoing resilient expansion outwardly into said channel for removal of a finished container from said mold cavity and of subsequently contracting to project into said cavity for formation of another container.

2. A forming mold as defined in claim 1 in which said modifying member is a torodial spring.

3. A forming mold as defined in claim 1 in which said mold body is provided with a retaining lip adjacent said annular channel for positioning said modifying member with respect to said cavity.

References Cited in the file of this patent

UNITED STATES PATENTS

| | | |
|---|---|---|
| 442,958 | Curran | Dec. 16, 1890 |
| 900,276 | Geffers | Oct. 6, 1908 |
| 1,707,794 | Blaker | Apr. 2, 1929 |
| 2,083,484 | Zampol | June 8, 1937 |
| 2,321,340 | Waterbury | June 8, 1943 |
| 2,337,998 | Karoff | Dec. 28, 1943 |
| 2,582,922 | Crowley et al. | Jan. 15, 1952 |
| 2,596,028 | James | May 6, 1952 |
| 2,598,791 | Hawkinson | June 3, 1952 |
| 2,929,124 | James | Mar. 22, 1960 |
| 2,955,322 | Hite | Oct. 11, 1960 |
| 2,985,914 | Miller | May 30, 1961 |
| 3,058,153 | Busch | Oct. 16, 1962 |